June 8, 1926.
H. SMITH
1,587,871
SPRING SUSPENSION FOR AUTMOBILES
Filed Jan. 5, 1925    2 Sheets-Sheet 1
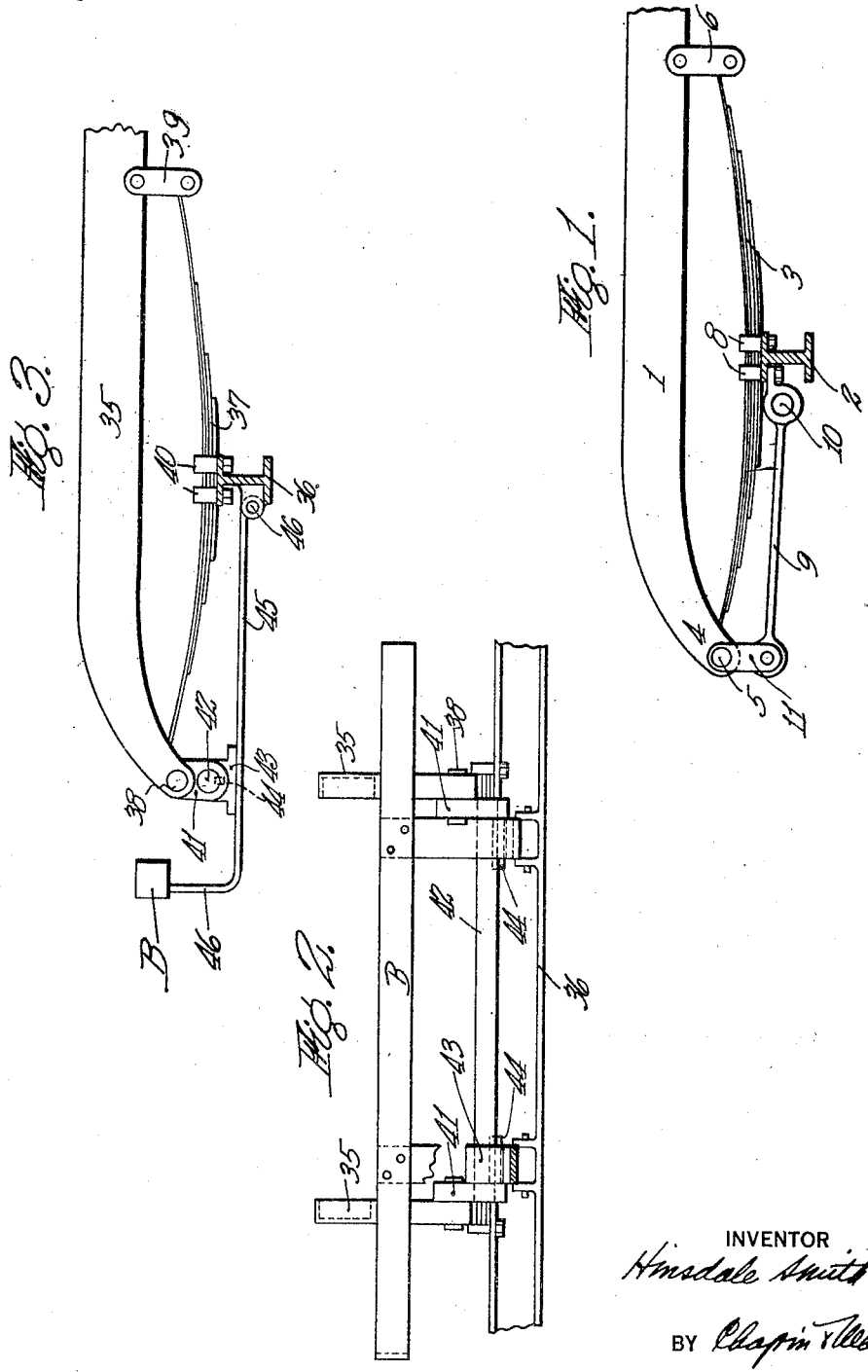
INVENTOR
Hinsdale Smith
BY Chapin & Neal
ATTORNEYS

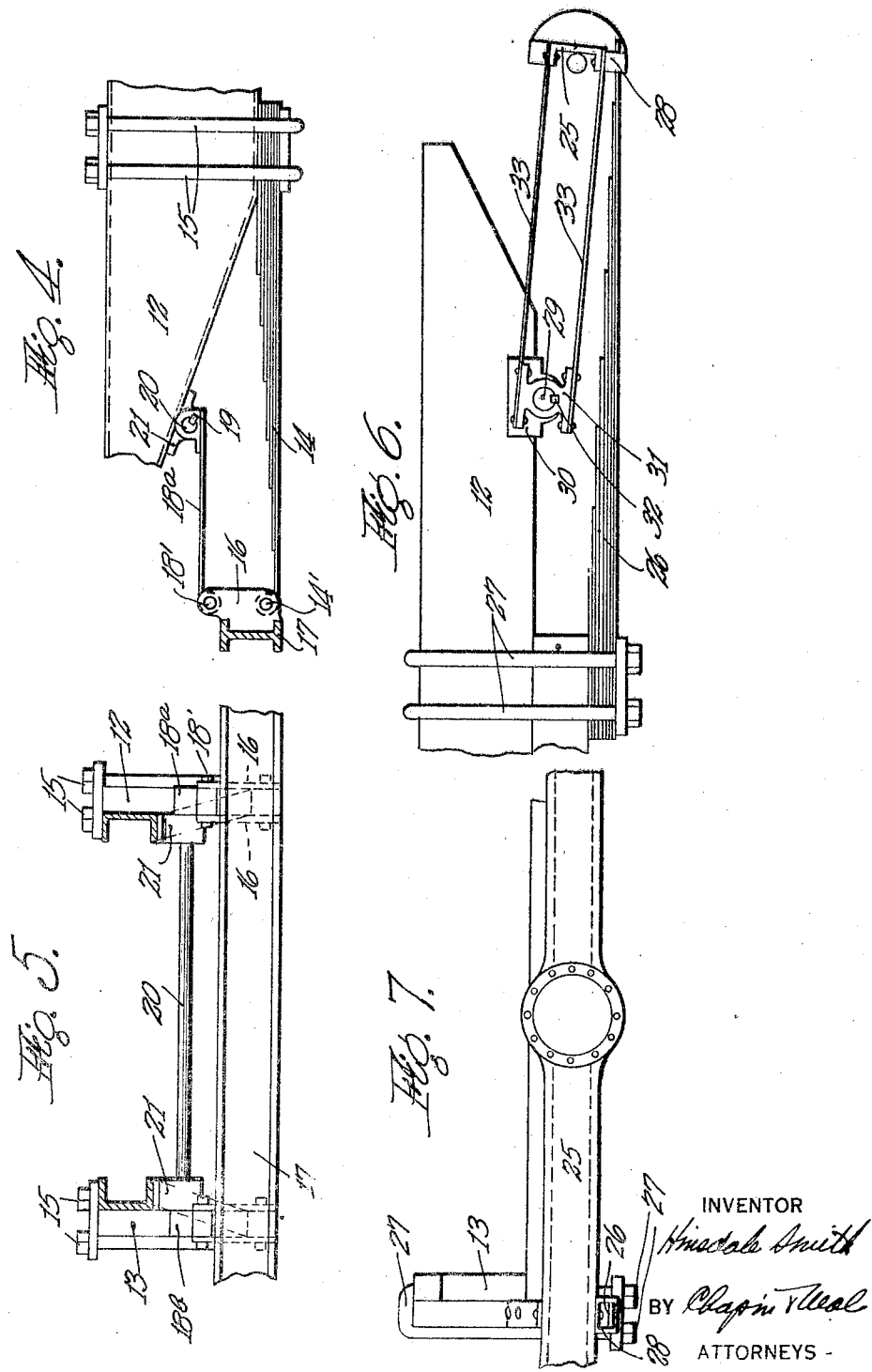

Patented June 8, 1926.

1,587,871

UNITED STATES PATENT OFFICE.

HINSDALE SMITH, OF KEYPORT, NEW JERSEY.

SPRING SUSPENSION FOR AUTOMOBILES.

Application filed January 5, 1925. Serial No. 528.

This invention relates to improvements in spring suspensions for vehicles, more particularly automobile chassis.

According to the present practice, the springs used in connection with automobile chassis are designed for a double duty, namely; for resiliently supporting the body on the chassis for a relative vertical movement between the same as well as for resisting the tilting and side swaying motion as the automobile rounds curves or when its wheels are raised or lowered by unevenness of the roadway. In other words, the springs now commonly used are made stiff and heavy enough to withstand the twisting action caused by the rocking and side swaying of the body with respect to the axles but are unnecessarily stiff for the relative vertical movement of the body and chassis. Soft flexible springs, however, that are best adapted for resiliently supporting the body do not possess the necessary rigidity to resist the twisting action caused by side swaying or tilting of the body with respect to the axles. Therefore, the heavy springs while capable of resisting the twisting action, are much too stiff or hard to yield readily and to give to the chassis the desired easy riding qualities.

According to one feature of my invention, I provide a spring suspension that incorporates a soft flexible spring that is adapted to yield readily and which allows the chassis to freely rise and fall in the normal operation of the automobile. According to another feature of the invention, I provide means associated with the soft spring, that cooperates therewith under certain conditions to reinforce the said spring and to lend rigidity thereto whereby the structure is adapted to resist the twisting action caused by the side swaying or tilting motion of the automobile.

In effect, I provide a spring suspension that includes springs adapted to permit relatively free and easy vertical movement of the body with respect to the chassis and associated therewith yieldable supplemental spring members adapted and arranged to reinforce the spring at such times as it is subjected to a twisting action caused by a tilting or side swaying movement of the body with respect to the axles.

The invention is applicable to various types of vehicles and may be used with various types of spring suspensions therefor but will now be described according to the modifications at present preferred, the same being illustrated in the accompanying drawings in which:

Fig. 1 is a side elevational view of the forward end of an automobile having a spring suspension according to my invention associated therewith;

Figs. 2 and 3 are end and side elevational views of the forward end of an automobile frame having my improved spring suspension affixed thereto;

Figs. 4 and 5 are side and end elevational views of the forward end of an automobile frame incorporating a modification of the invention and Figs. 6 and 7 are side and end elevational views of the rear end of an automobile frame showing a further modification of the invention incorporated therewith.

Referring to the drawing in detail, particularly Fig. 1, the forward end of a typical side frame is indicated at 1 that is supported from the axle 2 by a half-elliptical spring member 3. The said spring is pivoted at its forward end to the horn 4 of the frame as at 5 while its rear end is connected to the frame by means of a shackle 6 of the usual and well known form while the spring and axle may be rigidly secured together in the usual manner by the clamp bolts 8. According to my invention, the spring 3 is preferably composed of comparatively few leaves or spring members to provide a soft flexible and easily yieldable spring member whereby the frame 1 may freely rise and fall with respect to the axle in the usual and normal operation of the automobile. The spring 3, however, may be made in any desired degree of stiffness, depending upon the weight of the chassis and resiliency required. According to the preferred practice of the invention, it is intended that the spring be designed so that it is more particularly adapted for resiliently supporting the body in the desired manner rather than for resisting a twisting action or to prevent a side swaying motion thereof, although of course, the spring will naturally and to a considerable extent resist a twisting action caused by a sidewise tilting movement of the frame with respect to the axle.

Means are provided to reinforce the effect of spring 3 in resisting a tilting of the frame and comprise a yieldable spring leaf like member 9 disposed below the spring as shown. The member 9 at its rear end is hingedly connected to the axle as indicated at 10, while its forward or outer end is connected to the frame horn by means of a shackle 11. As will be seen from the foregoing, the soft flexible spring member 3 resiliently supports the frame and permits a relatively free vertical movement thereof while the hinged reinforcing member 9 merely floats on its hinged connections during this relative movement, but as the frame sways or rocks or is tilted with respect to the axle the weight of the body exerts a side thrusting and twisting action upon the spring. This action is imparted also to the member 9 which cooperates with and reinforces the said spring and they together act conjointly to resist the twisting action thereby functioning to arrest or retard the side swaying or tilting movement of the frame.

The form of the invention shown in Figs. 4 and 5 will now be described with reference to the forward end of an automobile frame the side members of which are indicated at 12 and 13. Springs 14 that are preferably of the so called soft or flexible type previously described are rigidly secured to the frame members in the usual manner by U bolts 15, and have their forward ends pivoted at 14' to lugs 16 carried by the axle 17. These springs like those previously described are intended more particularly to resiliently support the frame to allow a vertical movement of the frame and axle rather than for resisting a twisting movement caused by a side swaying or tilting of the frame. Reinforcing members 18ª and 18ᵇ, preferably in the form of flat bars that are spring like or of a yieldable nature are provided which are disposed in a substantially parallel relation with respect to the springs 14. These members have an eye formed in one end to receive pivots 18' of the lugs 16 of the axle. The other ends of the members 18ª and 18ᵇ are rigidly secured to collars which are fixed by means of a key 19 or the like to opposite ends of an oscillating shaft 20 carried in bearings 21 fixed to the frame sides 12 and 13. As in the form previously described, the frame is resiliently supported above the axle 17 by the springs 14 so that there may be a free relative vertical movement between the axle and frame. While the springs are flexed by the rising and falling movement of the frame the members 18ª and 18ᵇ move toward and away from the springs and by reason of the hinge action of the members 18ª and 18ᵇ in the bearing 18' the frame is not restricted or retarded in its up and down movement.

The up and down movement of the frame 12 in parallelism with the axle 17 will encounter no resistance from the members 18ª, 18ᵇ or shaft 20, inasmuch as during this movement the shaft will freely turn in its bearings 21. The only resistance to this free up and down movement of the frame in parallelism is offered by the comparatively light springs 14. If, however, the frame receives, from any cause, a tendency to rock on its longitudinal axis so that it no longer remains in parallelism with the axle 17, the spring action of members 18ª and 18ᵇ and the torsional resistance of shaft 20 come into play and yieldingly resist all tendency of the frame 12 to swing out of parallelism with the axle 17. This action will be obvious by considering a lowering tendency at one side, say the right side, of frame 12. Such movement through member 18ª bearing at 18' on the axle will tend to rotate shaft 20 clockwise within its bearing, but shaft 20 is fixed at its other end to member 18ᵇ and therefore cannot turn in its bearing without carrying arm 18ᵇ with it. But arm 18ᵇ is held down by its connection with the axle and yieldingly resists the tendency of shaft 20 to be turned. This action tends to bring down the left side of the frame 12 to the same degree as the right side.

It has been found that an automobile equipped with this arrangement will have its body lowered almost in parallelism with the ground even with a person standing on one running board thereof.

The suspension for the rear end of a chassis is illustrated in Figs. 6 and 7 in which the side frames are indicated at 12 and 13 and the rear or driving axle housing at 25. Springs 26 possessing the desired characteristics as to resiliency and flexibility and adapted for the practice of my invention are fixed to the frame by the U bolts 27 while the free ends thereof are in sliding engagement with a saddle 28 carried by the axle 25. This spring, like the former, is preferably so adapted and connected to the axle that the frame may rise and fall with a resilient action. An oscillating shaft 29 is carried in suitable bearings 30 fixed to the frame, while hubs 31 are fixed by keys 32 or the like to opposite ends of the said shaft. Reinforcing members 33 are rigidly fixed to opposite sides of the hubs 31 and to the rear axle 25 and are preferably arranged in pairs located at opposite ends of the shaft 29. This structure provides pairs of reinforcing members 33 that are fixed to opposite ends of an oscillating shaft 29 disposed transversely of the springs. In this form of the invention as the frame and axle are brought into a tilted relation the members 33 and shaft 29 act to reinforce the springs and to cooperate therewith to resist a twisting movement caused by the tilting or side swaying motion of the frame with respect to the axle.

The invention will now be described in connection with a typical automobile frame as shown in Figs. 2 and 3, in which case the frame is supported from the axle by the springs 37 the said springs being pivoted and connected to the frame by the pivot pin 38 and shackles 39 as shown. The axle 36 is fixed to the springs intermediate their ends by means of the bolts 40 in the usual and well known manner. These springs as in the former cases are designed to resiliently support the frame and are preferably more suitably adapted to allow a vertical movement of the frame than to prevent a tilting or side swaying relative movement thereof. Means adapted to cooperate with the springs to assist in resisting a side swaying movement, are provided and comprise yieldable reinforcing members 45 hinged to the axle at 46. Links 41 pivoted on the pivot pins 38 carry in their lower ends a transverse oscillating shaft 42, while brackets that are fixed by keys 44 to the shaft 42 adjacent the links are also fixed to the reinforcing members 45.

The outer ends 46 of the members 45 as shown in Figs. 2 and 3 may be extended forwardly and upwardly of the frame and are adapted to carry a transverse bar bumper B rigidly secured thereto. In operation the members merely float upon their pivotal connections as the frame moves vertically of the axle but as the frame and axle are brought into a tilted relation they act as in the former cases to reinforce the springs to assist in resisting a side swaying or tilting motion.

From the foregoing it will be observed that soft and flexible springs are provided for supporting the frame from the axle, while reinforcing members that permit a freely relative vertical movement of the frame under normal conditions are provided that are adapted to reinforce the springs and to assist them in resisting a side swaying or tilting movement of the frame.

I am aware that many changes may be made in the form of the invention without departing from the scope thereof, I prefer, therefore, to be limited by the following claims rather than by the foregoing description.

What I claim is:

1. The combination of a vehicle frame and axle with a spring suspension therefor comprising, a spring connected to said frame and axle for supporting the frame above said axle, a non-supporting member, connections between said non-supporting member and the axle and frame, and a member extending forwardly of said connections.

2. The combination of a vehicle frame and axle with a spring suspension therefor comprising, a spring connected to said frame and axle for supporting the frame above said axle, non-suppporting members, connections between said non-supporting members and the axle and frame and members extending forwardly of said connections.

3. The combination of a vehicle frame member and an axle member with a spring suspension therefor comprising, a spring connected to said members for resiliently supporting one above the other, an oscillating shaft carried by one of said members, non-supporting bars fixed at one end to said oscillating shaft, connections between the other ends of said non-supporting bars and the other of said members and members extending forwardly of said connections and a member extending between and carried by the said members.

4. The combination of an automobile frame and axle with a spring suspension therefor comprising, springs connected to the frame and axle for resiliently supporting the frame above the axle, a shaft rotatable in the frame, non-supporting members fixed to said shaft and connected to the axle for a hinge action to permit a relative vertical movement of the frame and axle and adapted to resist a relative tilting movement of the frame and axle, the said non-supporting members extending forwardly of the frame and a transverse member carried by the ends of said non-supporting member.

5. The combination of an automobile frame and axle with a spring suspension therefor comprising, springs connected to the frame and axle for resiliently supporting the frame above the axle, a shaft rotatable in the frame, non-supporting members fixed to said shaft and connected to the axle for a hinge action to permit a relative vertical movement of the frame and axle and adapted to resist a relative tilting movement of the frame and axle, the said non-supporting member extending forwardly of the frame and having a transverse bumper member rigidly secured thereto.

6. The combination of a vehicle frame member and an axle member with a spring suspension therefor comprising, springs connected to said members for resiliently supporting the frame member above the axle member, an oscillating shaft carried by one of said members and disposed parallel to said axle, non-supporting members fixed to said shaft and pivotally connected to one of said members and adapted to permit a free flexing movement of said springs and to resist a tilting movement of said frame and axle, members extending forwardly of said axle and a transverse member carried by the ends thereof.

In testimony whereof I have affixed my signature.

HINSDALE SMITH.